United States Patent
Pfister

(10) Patent No.: US 9,069,342 B2
(45) Date of Patent: Jun. 30, 2015

(54) METHOD FOR OPERATING A DRIVE CONTROL DEVICE AND DRIVE CONTROL DEVICE HAVING MEANS FOR USE IN SUCH A METHOD

(75) Inventor: Alexander Pfister, Eggolsheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 557 days.

(21) Appl. No.: 13/446,539

(22) Filed: Apr. 13, 2012

(65) Prior Publication Data

US 2012/0265349 A1 Oct. 18, 2012

(30) Foreign Application Priority Data

Apr. 13, 2011 (EP) .................................... 11162167

(51) Int. Cl.
*G06F 3/00* (2006.01)
*G05B 19/042* (2006.01)

(52) U.S. Cl.
CPC .... *G05B 19/042* (2013.01); *G05B 2219/23301* (2013.01)

(58) Field of Classification Search
None
See application file for complete search history.

(56) References Cited

U.S. PATENT DOCUMENTS

| 6,732,191 B1* | 5/2004 | Baker et al. ........................ 710/1 |
| 2007/0043457 A1* | 2/2007 | Davis ............................. 700/90 |
| 2007/0130310 A1 | 6/2007 | Baczkowski | |

FOREIGN PATENT DOCUMENTS

WO   WO 2007061330 A1   5/2007

* cited by examiner

*Primary Examiner* — Idriss N Alrobaye
*Assistant Examiner* — David Martinez
(74) *Attorney, Agent, or Firm* — Henry Feiereisen LLC.

(57) ABSTRACT

A method for operating a drive control device includes sending and receiving data over a bus connected to a bus port of a drive control device which has in addition to the bus port a communication interface and a memory, loading into the memory a basic functionality, which includes a software interface, for controlling and/or regulating a connected motor, loading into the memory during operation of the drive control device a functionality of a web server which cooperatively interacts with the basic functionality via the software interface, and forwarding to the web server incoming data received via the communication interface for editing or processing.

7 Claims, 5 Drawing Sheets

METHOD FOR OPERATING A DRIVE CONTROL DEVICE AND DRIVE CONTROL DEVICE HAVING MEANS FOR USE IN SUCH A METHOD

CROSS-REFERENCES TO RELATED APPLICATIONS

This application claims the priority of European Patent Application, Serial No. EP11162167, filed Apr. 13, 2011, pursuant to 35 U.S.C. 119(a)-(d), the content of which is incorporated herein by reference in its entirety as if fully set forth herein.

BACKGROUND OF THE INVENTION

The present invention relates to a method for operating a drive control device, wherein the drive control device comprises at least one bus port and a communication interface for connecting to a bus and for sending and receiving data over the bus.

The following discussion of related art is provided to assist the reader in understanding the advantages of the invention, and is not to be construed as an admission that this related art is prior art to this invention.

Drive control devices of said type, e.g. for connecting electric motors, are known per se. The performance and functionality of such drive control devices have constantly increased over the last several years, with the result that a multiplicity of additional functions in addition to, for example, frequency conversion, speed control or rotational speed regulation are provided. An example of an additional functionality of this type is the possibility of connecting such drive control devices to a bus, e.g. a fieldbus or the like, and accordingly to integrate the drive control device, together with further communication subscribers, into an automation system in which each communication subscriber, i.e. including the drive control device, can be reached. Given such reachability of the drive control device via a bus it is possible to configure or parameterize the drive control device centrally. Furthermore, it is also possible to query and/or continuously monitor the status of the drive control device from a central point.

In order to improve the ability to control and use such measures by a user accessing the respective drive control device, not directly, but from a central point, e.g. a master control station or the like, consideration was given in the prior art to providing the functionality of what are called web servers on drive control devices of the above-described type. Such a web server manages at least one predefined or predefinable web page in which a visualization of e.g. system or operating parameters of the drive control device and/or currently valid measured values in relation to a mode of operation of the drive control device can be contained in summary form. Currently valid measured values may include e.g. a current rotational speed of a connected motor. The result for the user when the corresponding web page is called is a clearly organized presentation of the data incorporated in the web page. The effect of the functionality as a web server is that data and explanatory texts are or can be combined in a simple manner in an attractively formatted way and that such information is presented at a requesting station, e.g. the master control station in the example chosen here, as the unit accessing the web server of the drive control device.

Even if this additional set of functions of drive control devices is extremely useful and helpful, an obstacle to providing such functionality in the drive control device is, however, that on the one hand such functionality takes up storage space in a memory of the drive control device and on the other hand occupies further resources during the operation of the drive control device, namely it not only costs computing time, but also reduces the volume of data which can be transferred over the bus and to the drive control device in one time unit if an access to the web server incorporated in the drive control device also takes place in the time unit.

It would therefore be desirable and advantageous to obviate or at least reduce the effects of prior art shortcomings and to provide an improved method for operating a drive control device and to also provide a drive control device which can be used in such a method, wherein the aforementioned disadvantages are avoided.

SUMMARY OF THE INVENTION

According to one aspect of the present invention, a method for operating a drive control device includes the steps of sending and receiving data over a bus connected to at least one bus port of a drive control device, the drive control device comprising in addition to the at least one bus port a communication interface and a memory, loading into the memory at least one basic functionality for controlling and/or regulating a connected motor, said basic functionality including a software interface, during operation of the drive control device, loading into the memory a functionality of a web server which cooperatively interacts with the basic functionality via the software interface, and forwarding to the web server incoming data received via the communication interface for editing or processing.

Toward that end, it is provided in a method for operating a drive control device of the type that the drive control device comprises a memory into which at least a basic functionality—referred to as a kernel—is loaded at least for the purpose of controlling and/or regulating a connected or connectable motor, in that the drive control device includes a software interface as part of the basic functionality, in that during the operation of the drive control device there is loaded into its memory the functionality of a web server which cooperatively interacts with the basic functionality via the software interface, and in that incoming data arriving via the communication interface for the web server is forwarded to the latter for editing or processing.

According to another aspect of the invention, a drive control device includes a bus port and a communication interface connected to a bus for sending and receiving data over the bus, a memory and a basic functionality (kernel) loadable into the memory at least for controlling and/or regulating a connected motor, and a software interface as part of the basic functionality for dynamically loading a functionality of a web server and combining the functionality of the web server with the basic functionality.

According to an advantageous feature of the present invention, the functionality of a web server remains available for a drive control device without said functionality having to be kept permanently resident in the memory of the drive control device. In short, therefore, a drive control device and a method for operating a drive control device with a dynamically loadable web server are proposed. For this purpose, a basic functionality which is always required in the memory of the drive control device—referred to as the kernel—includes a software interface or has access to such a software interface by means of which the functionality of a web server is combinable with the basic functionality in a dynamically loadable manner. During operation of the drive control device the web server cooperatively interacts with the basic functionality via said software interface. Data arriving via the communication interface, i.e. incoming data from external sources, for the web server is forwarded to the latter for editing or processing. Having been loaded into the memory of the drive control device, the web server therefore becomes part, at least temporarily, of the functionality there and to that extent supplements the functionality of the kernel with the functionality of a web server.

According to an advantageous feature of the present invention, the functionality of the web server is assured immediately when the web server is loaded into the memory and the interfaces associated therewith are connected, if the web server includes an input and an output interface as dynamically loadable functionality for the drive control device, wherein at the time of loading the web server into the memory of the drive control device the input interface of the web server can be or is connected to the communication interface of the drive control device and the output interface of the web server can be or is connected to the software interface of the drive control device. This is a result of the fact that the web server can not only respond to incoming data, ordinarily queries, but itself can also query data of the drive control device via its basic functionality. Because of its connection via its input interface to the communication interface of the drive control device, the web server can respond to incoming data, i.e. transmissions for the web server. Because of its connection via its output interface and the software interface of the drive control device to the basic functionality (kernel) of the drive control device, the web server can access the latter's data, thus enabling web pages provided by the web server to be filled with current data. As a result it is possible for a remote station to query status values and the like via the web server.

According to an advantageous feature of the present invention, a drive control device having means for use in such a method may have a computer program having program code means for connecting an input interface of a web server loaded into a memory of a drive control device to a communication interface of the drive control device and for connecting an output interface of the web server to a software interface to a basic functionality of the drive control device. In this case the computer program may be considered as functionality, in other words e.g. as a subroutine or module of the kernel. At the time of loading the web server into the memory this functionality is invoked automatically and subsequently the connection between the said interfaces, which are software interfaces, is established automatically, such that the web server loaded into the memory is connected to the communication interface on one side and, via the software interface, to the kernel on the other side.

According to an advantageous feature of the present invention, the connection of the input interface to the communication interface and/or the connection of the output interface to the software interface may be accomplished automatically in conjunction with the loading of the web server into the memory of the drive control device. For that purpose it is e.g. provided that the loading of a web server into the memory of the drive control device requires a corresponding registration with the basic functionality of the drive control device, whereupon the latter releases corresponding storage space in the memory and/or outputs a start address in the memory at which the web server can be stored or is already stored in connection with the load request. To that extent the basic functionality can then continue to monitor the loading of the server into the memory and when the web server becomes available in the memory can automatically effect the connection of the said interfaces.

During the operation of the drive control device with dynamically loadable web server loaded, incoming data for the web server arriving via the communication interface can be forwarded to the web server via its input interface for editing or processing and the web server will access the basic functionality of the drive control device as necessary via its output interface in order e.g. to read out or modify operating parameters of the drive control device or to read out status information of the drive control device and/or of a connected motor.

According to an advantageous feature of the present invention, in order to deactivate a web server loaded into the memory of the drive control device, the connection between input interface and communication interface on the one side and output interface and software interface on the other side may be severed and the storage space occupied by the web server in the memory may be at least flagged as available. Immediately when the connection between the individual interfaces is severed, the web server no longer appears externally. Thus, the web server no longer requires any computing power from the drive control device. Since the storage space occupied by the web server in the memory is additionally flagged as available, said storage space is also available to other dynamically loadable functions which can be dynamically loaded in accordance with the same principle as the dynamic loading of the web server, i.e. in that the basic functionality and its software interface are used for that purpose.

Insofar as the method is or can be implemented in software, the invention may also be a computer program having program code instructions that are executable by a computer and on the other hand a storage medium having a computer program of said type, as well as finally also a drive control device into the memory of which such a computer program has been or can be loaded as a means for performing the method and its embodiments.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
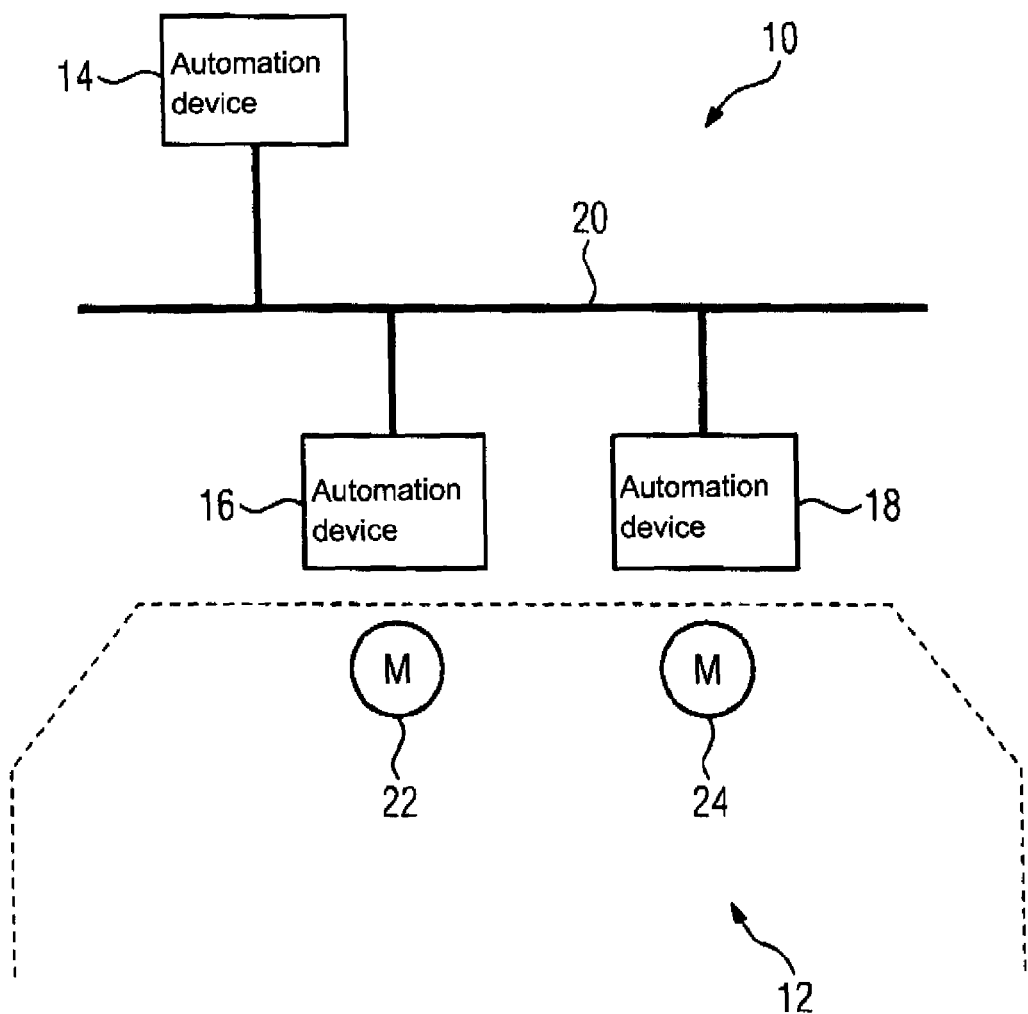
FIG. 1 shows an automation system having a drive control device.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a greatly simplified schematic representation of an automation system, designated as a whole by reference numeral 10, which controls and/or monitors an industrial technical process 12, e.g. a production process, which is not illustrated in further detail. The automation system 10 comprises a plurality of automation devices 14, 16, 18 which are communicatively connected to one another via a bus 20. The automation devices 14, 16, 18 comprise e.g. a master control station 14 (a programmable logic controller, for example) and a first and a second drive control device 16, 18 which respectively control and/or monitor a motor 22, 24 contained in the technical process 12.

Using a web server for the purpose of configuring such drive control devices 16, 18 is known per se. Such web servers are implemented in a memory of the respective drive control device 16, 18 so that a master control station 14 can access the drive control device 16, 18 and the web server contained therein via the bus 20. The access to the web server enables status values for the respective drive control device 16, 18 and/or the connected motor 22, 24 to be visualized in a manner known per se. Furthermore, the web server supports a configuration of the drive control device 16, 18, e.g. through specification of speed or rotational speed setpoint values, through specification of control and regulating parameters, etc.

In respect of a web server incorporated by a drive control device 16, 18, an automation device 14 accessing the web server, e.g. the master control station 14, acts like a web client, the respective automation device 14 comprising or providing a functionality for a web client, e.g. in the form of what is called a browser.

Figure 2:
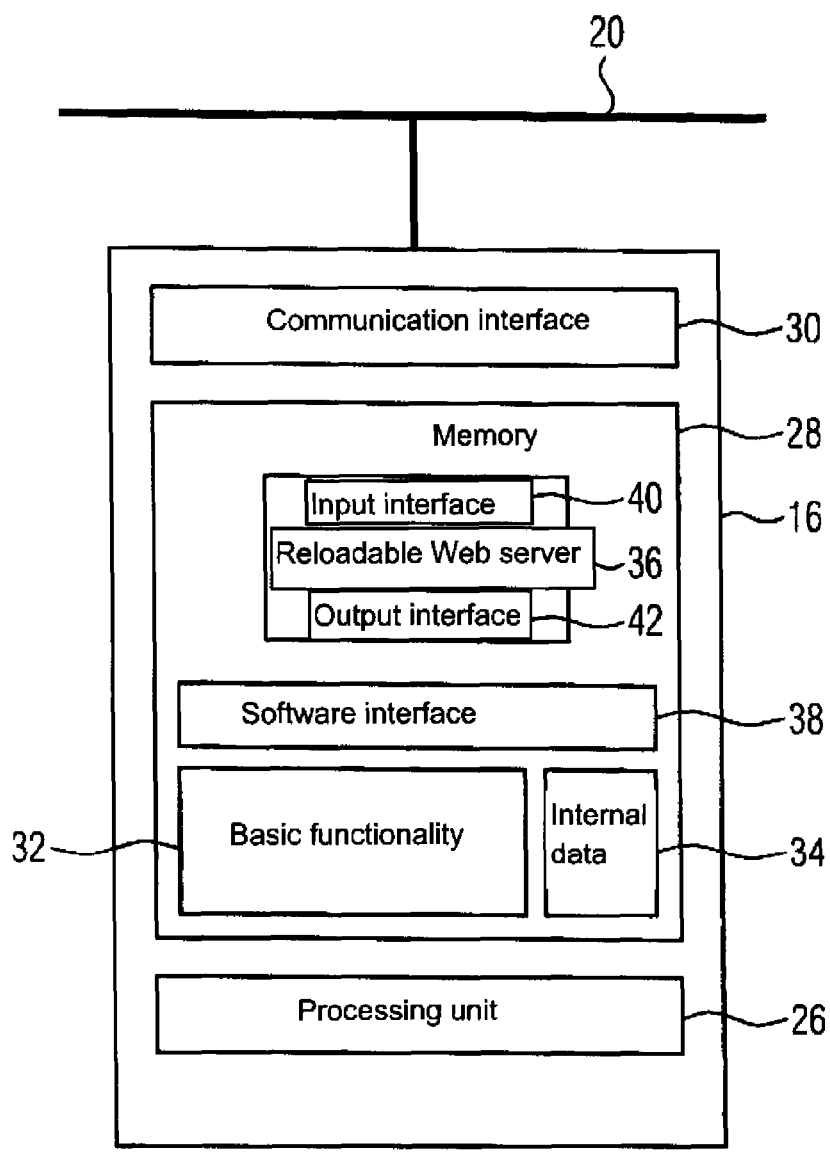
FIG. 2 shows details in relation to a drive control device according to the present invention.

FIG. 2 shows an extract from the situation according to FIG. 1 and one of the drive control devices 16, 18 with further details. According thereto, each drive control device 16, 18 includes a processing unit 26 in the manner of a microprocessor or the like. Each drive control device 16, 18 additionally includes a memory 28 and a communication interface 30. A basic functionality 32 known as a kernel is loaded into the memory 28 and provides, in the form of a computer program containing computer program instructions, an implementation of the functionality encompassed by the drive control device 16, 18 for the purpose of controlling and/or monitoring the respective connected motor 22, 24 (FIG. 1). Likewise contained in the memory 28 is internal data 34 of the drive control device 16, 18, that is to say e.g. data relating to the type of connected motor 22, 24, data for controlling and/or monitoring same, specifically e.g. speed setpoint values, control and regulating parameters, etc.

In the case of drive control devices 16, 18 with integrated web server, the latter's functionality is likewise stored in the respective memory 28. The web server is executed by the processing unit 26 in contention with or under the control of the basic functionality 32. The web server therefore occupies resources of the drive control device 16, 18, specifically at least storage space in the memory 28 and computing power of the processing unit 26.

A drive control device 16, 18 having a dynamically loadable web server 36 is proposed here. The dynamically loadable web server (referred to hereinafter simply as web server 36 for short) is also held resident as a computer program containing computer program instructions in the memory 28 when such a functionality has been loaded into the memory 28.

In order to enable a dynamically loadable web server 36 in the memory 28 of the drive control device 16, 18 to be made executable, the basic functionality 32 includes a software interface 38 or such a software interface 38 is assigned to the basic functionality 32. The dynamically loadable web server 36 for its part likewise includes interfaces, specifically an input interface 40 and an output interface 42. When the functionality of a web server 36 is loaded into the memory 28 of the drive control device 16, 18 during operation of the latter, the web server 36 cooperatively interacts with the basic functionality 32 via the software interface 38 or, conversely, the basic functionality 32 cooperatively interacts with the web server 36 via the software interface 38. Incoming data for the web server 36 arriving via the communication interface 30 in the respective drive control device 16, 18 is forwarded to the web server 36 for editing or processing. In the case of a web server 36 having an input and output interface 40, 42, at the time of loading the web server 36 into the memory 28 or in conjunction with its loading into the memory 28, a connection of the input interface 40 of the web server 36 is established to the communication interface 30 of the drive control device 16, 18 and a connection of the output interface 42 of the dynamically loadable web server 36 is established to the software interface 38 of the drive control device 16, 18. The connection of the input interface 40 to the communication interface 30 and/or the connection of the output interface 42 to the software interface 38 are/is effected by e.g. the basic functionality 32 automatically when a function provided therein is invoked in order to install a web server 36 in the memory 28 as a dynamically loadable function.

When a dynamically loadable web server 36 is loaded in the memory 28 of a drive control device 16, 18 and is connected via its input and output interface 40, 42 to the communication interface 30 on one side and the software interface 38 on the other side, incoming data for the web server 36 arriving via the communication interface 30 is forwarded to the web server 36 via its input interface 40 for editing or processing and the web server 36 accesses the basic functionality 32 of the drive control device 16, 18 as necessary via its output interface 42 and consequently at least indirectly accesses the data 34, with the result that the web server 36 provides not only a formatted presentation of such data for user information purposes, but also a possibility of influencing individual items of such data.

Figure 3:
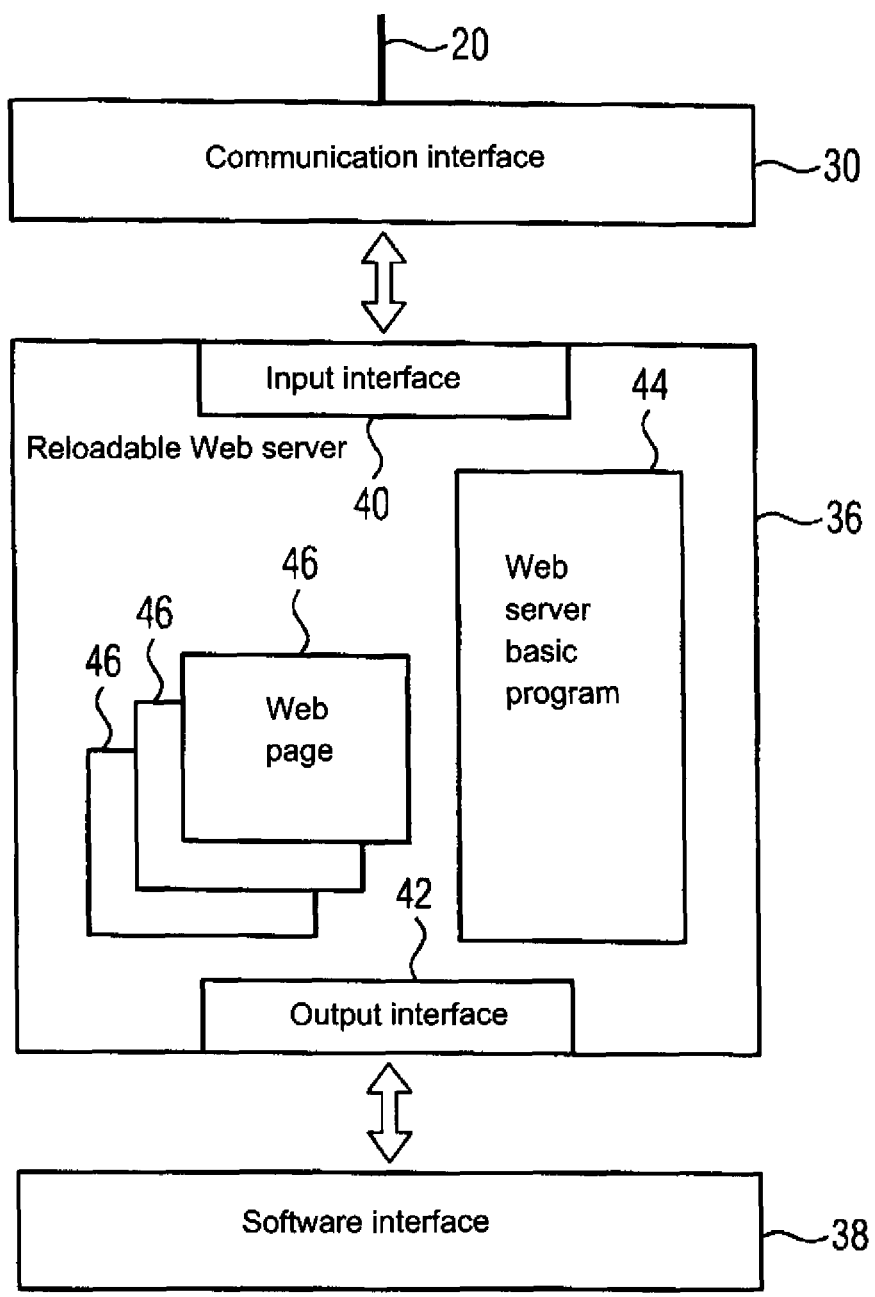
FIG. 3 shows details in relation to a web server which can be loaded into a memory of the drive control device according to FIG. 2.

FIG. 3 shows a magnified illustration of the situation according to FIG. 2 with further details for the web server 36. It is shown that the dynamically loadable web server 36, as a computer program containing program code instructions having program code instructions that are executable by means of the processing unit 26 (FIG. 2), comprises a web server basic program 44 and one or more web pages 46. Instead of web pages 46 directly incorporated by the web server 36 it can also be provided that said web pages are held resident independently of the web server 36 in the memory 28 (FIG. 2) of the drive control device 16, 18 or in a remote memory (not shown) and are accessible to the web server 36. The structure of web pages 46 is known per se, so no further explanation is necessary here. The functionality of the web server basic program 44 is likewise known per se, so that further explanations are also superfluous in this regard.

Figure 4:
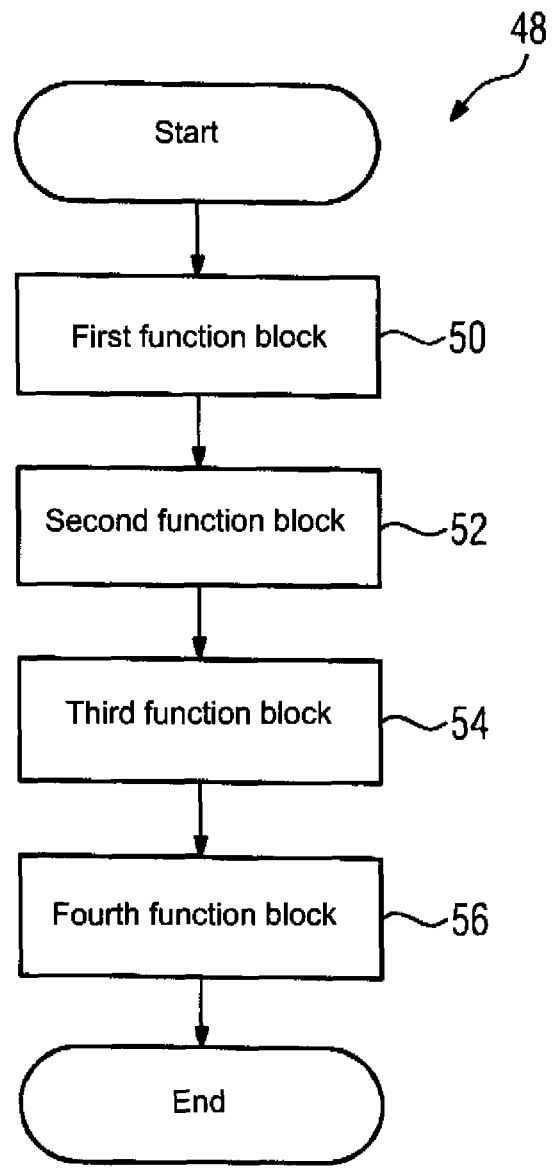
FIG. 4 shows a simplified representation of an algorithm for loading a web server or another software functionality into a memory of a drive control device.

Finally, FIG. 4 shows a simplified schematic representation of an algorithm for a computer program containing computer program code instructions for implementing the method as herein described. The computer program may be included as part of the basic functionality 32, e.g. in the form of a subroutine. The computer program designated as a whole by reference numeral 48 starts with a first function block 50 by means of which the request to load a web server 36 into the memory 28 of the drive control device 16, 18 is registered with the basic functionality 32 and a check of the functionality of the software interface 38 is carried out for that purpose. In a second function block 52 following on therefrom, a check is carried out to determine whether sufficient free storage space for loading the web server 36 into the memory 28 is available in the memory 28. The loading of the web server 36 into the memory 28 is permitted and initiated by means of a third function block 54 following on therefrom, e.g. in that a start address for the web server 36 in the memory 28 is specified. In a fourth function block 56, in the case of a web server having an input and output interface 40, 42, the input interface 40 is connected to the communication interface 30 and the output interface 42 is connected to the software interface 38. The dynamic loading of a web server 36 into the memory 28 of a drive control device 16, 18 is thereby concluded. Incoming data arriving for the web server 36 in a drive control device 16, 18 via the communication interface 30 is supplied to the web server 36 owing to the connection of said communication interface 30 to the input interface 40 of the web server 36. Via its output interface 42, the web server for its part can access the software interface 38 and from there the basic functionality 32 and/or data 34 of the drive control device 16 in order to handle status queries, parameterizations, configuration changes, etc.

Figure 5:
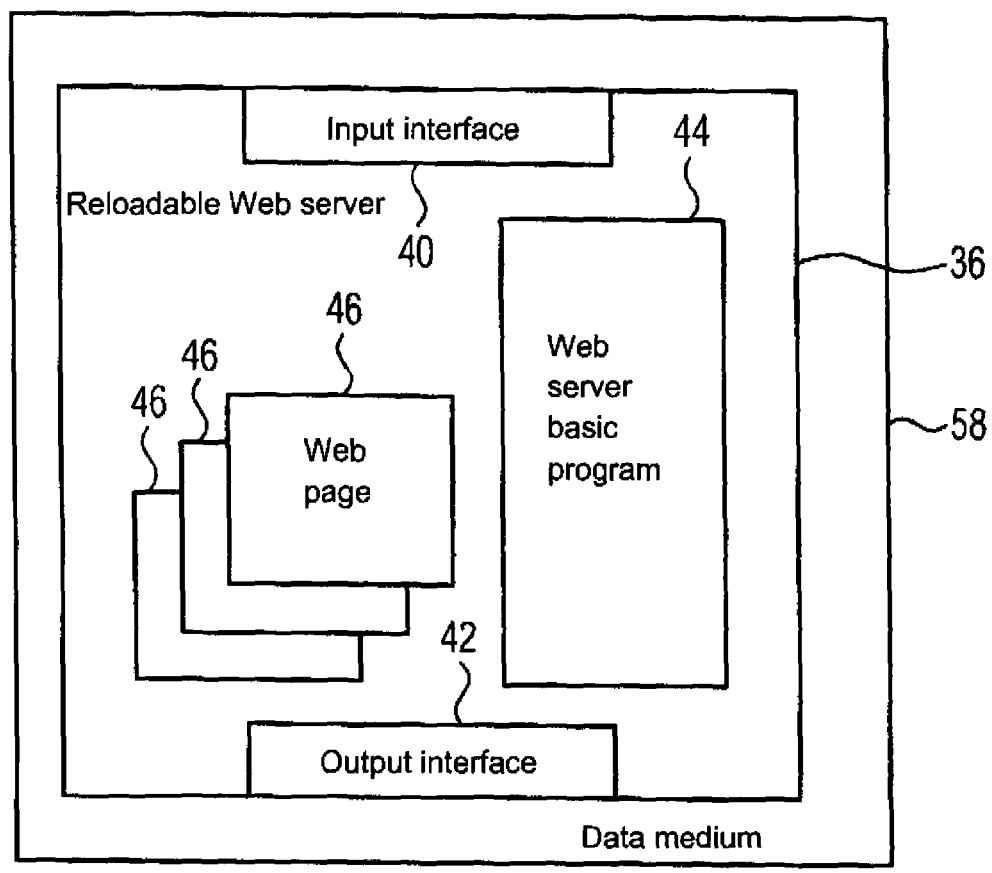
FIG. 5 shows a simplified representation of a storage medium containing a web server and web pages for loading into a memory of a drive control device.

In conclusion, FIG. 5 shows a greatly simplified schematic representation of a data medium 58, that is to say e.g. an electromagnetic data medium, an optical data medium, etc. in the guise of a diskette, a CD-ROM and the like, containing a web server 36 and web pages 46 incorporated therein, as shown in FIG. 3. By combining such a data medium either indirectly or directly, e.g. via a bus 20 (FIG. 1), with a drive control device 16, 18 it is possible to load the functionality of a web server 36 into the memory 28 there.

Accordingly, a possibility is disclosed for installing and initiating the execution of only such software, specifically e.g. a web server 36, which is necessary for the user on drive control devices 16, 18. The software interface 38 is provided for this purpose, said software interface 38 enabling, in conjunction with a basic functionality 32 extended for its operation and control, specific software modules, namely e.g. a web server 36, to be loaded and executed or also such functions to be unloaded, i.e. to be deactivated.

The advantages associated therewith are obvious: Storage space in the memory 28 is occupied only when a web server 36 or similar is actually required. Computing power of the respective processing unit 26 is also required by dynamically loadable software modules only when the latter are resident in the memory 28 and are activated, that is to say e.g. by connection to the communication interface 30 and the software interface 38. The software functions of the web server 36 can be developed, marketed, modified and maintained as a self-contained standalone package independently of the drive control device 16, 18. Its adaptation to the constant technological advancements in what is called the web is independent of the further development of the drive control device 16, 18.

The software interface 38, the basic functionality 32 and the communication interface 30 are elements of a drive control device 16, 18. The software interface 38 and its operation and control by means of the basic functionality 32 on one side, as well as the communication interface 30 on the other side, and finally the interfaces encompassed by the dynamically loadable web server 36, namely the input and output interface 40, 42, are means for using the drive control device 16, 18 in the method herein described.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a drive control device, comprising the steps of:
   sending and receiving data over a bus connected to at least one bus port of the drive control device, the drive control device comprising in addition to the at least one bus port a communication interface and a memory;
   loading into the memory at least one basic functionality for controlling or regulating a connected motor, said basic functionality including a software interface;
   during operation of the drive control device, loading into the memory a functionality of a web server which comprises, as a dynamically loadable functionality for the drive control device, an input interface and an output interface, and which cooperatively interacts with the basic functionality via the software interface;
   connecting, at the time the web server is loaded into the memory of the drive control device, the input interface of the web server to the communication interface of the drive control device and connecting the output interface of the web server to the software interface; and
   forwarding to the web server incoming data received via the communication interface for editing or processing.

2. The method of claim 1, wherein the input interface is automatically connected to the communication interface or the output interface is automatically connected to the software interface when loading of the web server into the memory of the drive control device.

3. The method of claim 1, wherein incoming data for the web server arriving via the communication interface are forwarded to the web server via the input interface of the web server for editing or processing and wherein the web server accesses the basic functionality of the drive control device via the output interface of the web server, as required.

4. The method of claim 1, and further comprising deactivating a web server loaded into the memory of the drive control device by severing a connection between the input interface and the communication interface and by severing a connection between the output interface and the software interface, and by flagging storage space occupied in the memory by the web server as being available.

5. A drive control device, comprising:
   a bus port and a communication interface connected to a bus for sending and receiving data over the bus;
   a memory and a basic functionality loadable into the memory at least for controlling or regulating a connected motor; and
   a software interface as part of the basic functionality for dynamically loading during operation of the drive control device a functionality of a web server which comprises, as a dynamically loadable functionality for the drive control device, an input interface and an output interface, and which cooperatively interacts with the basic functionality via the software interface;

wherein the drive control device is configured to connect, at the time the web server is loaded into the memory of the drive control device, the input interface of the web server to the communication interface of the drive control device and to connect the output interface of the web server to the software interface; and to forward to the web server incoming data received via the communication interface for editing or processing.

6. A computer program having program code means stored on a non-transitory computer-readable data medium, said computer program, when loaded into a memory of a drive control device and executed by the drive control device, causing the drive control device to:

send and receive data over a bus connected to at least one bus port of the drive control device, the drive control device comprising in addition to the at least one bus port a communication interface and a memory;

load into the memory at least one basic functionality for controlling or regulating a connected motor, said basic functionality including a software interface;

during operation of the drive control device, load into the memory a functionality of a web server which comprises, as a dynamically loadable functionality for the drive control device, an input interface and an output interface, and which cooperatively interacts with the basic functionality via the software interface;

connect, at the time the web server is loaded into the memory of the drive control device, the input interface of the web server to the communication interface of the drive control device; and connect the output interface of the web server to the software interface; and forward to the web server incoming data received via the communication interface for editing or processing.

7. A non-transitory computer-readable data medium comprising a computer program, which when loaded into a memory of a drive control device and executed by the drive control device, causes the drive control device to:

send and receive data over a bus connected to at least one bus port of the drive control device, the drive control device comprising in addition to the at least one bus port a communication interface;

load into the memory at least one basic functionality for controlling or regulating a connected motor, said basic functionality including a software interface;

during operation of the drive control device, load into the memory a functionality of a web server which comprises, as a dynamically loadable functionality for the drive control device, an input interface and an output interface, and which cooperatively interacts with the basic functionality via the software interface;

connect, at the time the web server is loaded into the memory of the drive control device, the input interface of the web server to the communication interface of the drive control device and connect the output interface of the web server to the software interface; and forward to the web server incoming data received via the communication interface for editing or processing.

* * * * *